July 28, 1970 R. B. McLEOD 3,522,378

TELEPHONE-TELEGRAPH COMMUNICATION SYSTEM

Filed Sept. 18, 1967 4 Sheets-Sheet 1

INVENTOR.
ROBERT B. McLEOD

BY
*Meyer, Tilberry & Body*

ATTORNEYS

July 28, 1970 R. B. McLEOD 3,522,378

TELEPHONE-TELEGRAPH COMMUNICATION SYSTEM

Filed Sept. 18, 1967 4 Sheets-Sheet 2

INVENTOR.
ROBERT B. McLEOD

BY
*Meyer, Tilberry & Body*
ATTORNEYS

TELEPHONE-TELEGRAPH COMMUNICATION SYSTEM

INVENTOR
ROBERT B. McLEOD
BY
*Meyer, Tilberry & Body*
ATTORNEYS

TELEPHONE-TELEGRAPH COMMUNICATION SYSTEM

INVENTOR.
ROBERT B. McLEOD
BY
Meyer, Tilberry & Body
ATTORNEYS

United States Patent Office 3,522,378

Patented July 28, 1970

3,522,378
TELEPHONE-TELEGRAPH COMMUNICATION SYSTEM

Robert B. McLeod, Clinton, Mass., assignor to E. W. Bliss Company, Canton, Ohio, a corporation of Delaware Filed Sept. 18, 1967, Ser. No. 668,593
Int. Cl. H04m *19/02*
U.S. Cl. 179—3 19 Claims

ABSTRACT OF THE DISCLOSURE

A combined telephone-telegraph communication system including a central station, a substation and a plurality of local stations connected together by coupling transformers. The substation includes bypassing equipment that permits telephones and telegraph communication signals between any of the local stations and the central station to be balanced, amplified and isolated so that usable telephone and telegraph signals are routed to the units for which they are intended.

DISCLOSURE

This invention pertains to the art of communications and, more particularly, to an improved combined telephone-telegraph communication system.

The present invention is particularly adapted for a fire or police call system, similar to that disclosed in U.S. application Ser. No. 403,316, filed Oct. 12, 1964, now Pat. No. 3,384,714, assigned to the same assignee as the present invention, and will be described with reference thereto; however, it is not to be limited to the same as it may be used for various applications in which combined telephone and telegraphy communications are desired.

The fire and police call system disclosed in U.S. Pat. No. 3,384,714, the parts of the disclosure of which are similar to this invention are incorporated herein by reference, is a combined telephone-telegraphy communication system. Briefly, that system includes a central station and a plurality of series connected local stations connected together in a series communication loop extending from the central station. Direct current, obtained from a central station source, normally flows in a given direction through the communication loop. Each local station includes a handset, which, when lifted, results in a coded frequency signal, representative of that station, being transmitted over the communication loop to the central station. Thereafter, voice communication between the central station and the local calling station is had over the communication loop. Thus, the system is directed to telephone-telegraph equipment designed to operate from a box location on a single series loop to another point on that loop, the central station.

Many of the larger cities have complex call box systems with multiple series loops of call boxes that operate with the central station. They employ substations linked to the central station by means of a single tie line. However, the existing fire alarm systems that use such substations, electro-mechanically couple these multiple series box loops to the single tie line, which terminates in the central station. Since there is no direct electrical connection between the series box loops and the central station, telephone communication cannot presently be used on such existing systems. It would be possible to transformer couple all of the box loop circuits to the central station circuit but this would not result in suitable operation for a telephone-telegraphy system due to attenuation, loading, and noise characteristics. Other considerations and problems would arise including possible degradation of the telegraphy function. It is highly desirable in such municipalities that the telephone-telegraph communications system utilize, wherever possible, the existing wire facilities and thereby alleviate the necessity of installing new metallic interconnecting circuits.

The present invention is directed to an improved communication system over the system disclosed in U.S. Pat. No. 3,384,714. It is also directed toward means for satisfying the foregoing needs of municipalities whose systems operate though substations, as well as others who desire a combined telephone-telegraphy system.

The present invention contemplates the provision of a combined telephone-telegraphy system including a series circuit of a plurality of local calling boxes and central station communication equipment coupled together in a circuit for maintaining current flow throughout the system, each of the local calling boxes and the central station equipment including means for transmitting and receiving coded box identifying frequency signals as well as voice communication signals for identifying the particular box transmitting the coded identifying signals.

In accordance with one aspect of the present invention, the improved system also includes means for coupling a second series circuit of a plurality of local calling boxes so that the voice and telegraphy communication signals may be had between the central station and a call box in either of the series circuit of local calling boxes.

In accordance with another aspect of the present invention the improved system also includes means for coupling series circuits of a plurality of local calling boxes to a central station so that voice and telegraphy communications signals from the central station to a call box will be controlled so as to follow one path through the coupling means, and so that voice and telegraphy communications signals from a call box to the central station will be controlled so as to follow a second path through the coupling means.

The primary object of this invention is the provision of an improved telephone-telegraphy communication system.

Another object of this invention is the provision of a telephone-telegraphy communication system that is simple in construction and economical to manufacture.

Another object of this invention is the provision of an improved telephone-telegraphy communication system that utilizes existing wire facilities.

Another object of this invention is the provision of bypassing equipment for an improved telephone-telegraphy communication system.

Further objects of this invention will become apparent from the following description of a specific example embodying the invention and the attached claims when taken in conjunction with the accompanying drawings in which:

GENERAL DESCRIPTION

Figure 1:
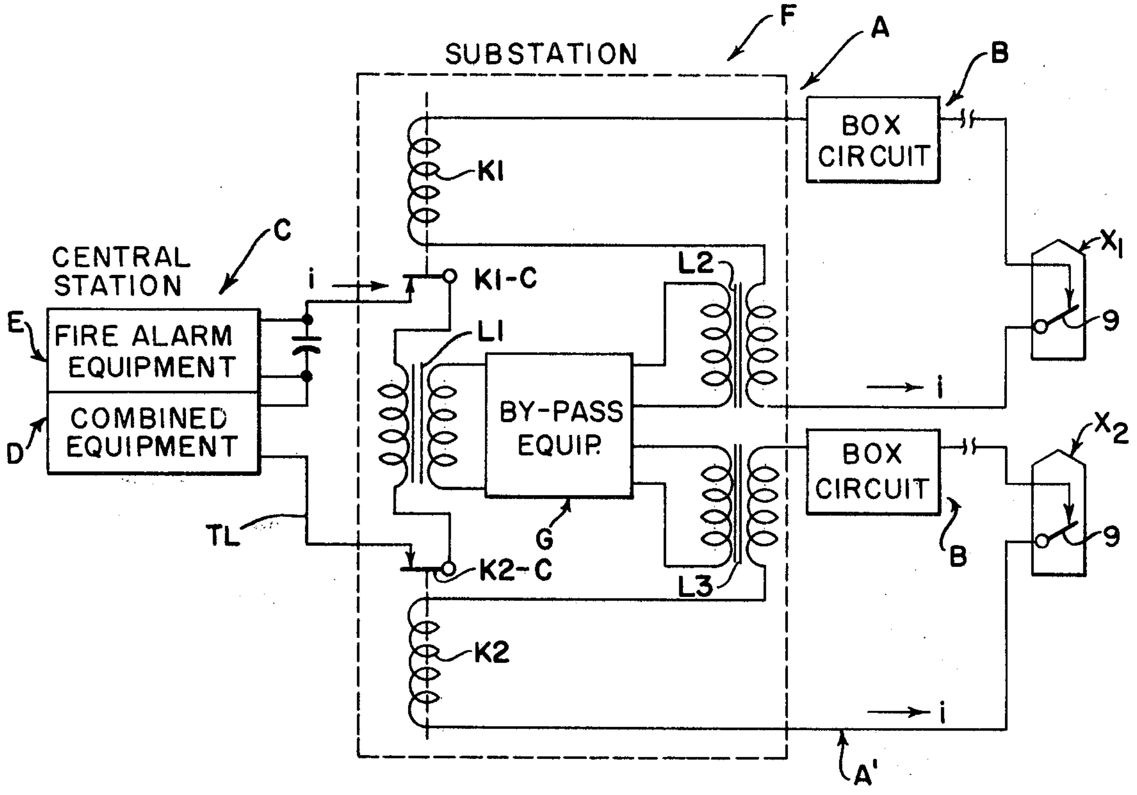
FIG. 1 is a schematic block diagram illustrating a plurality of series circuits of local calling boxes coupled to a central station via a substation.

Referring now to the drawings which are for the purpose of illustrating a preferred embodiment of the invention and not for the purpose of limiting the same. FIG.

1 illustrates, in block diagram form, a communication system as applied to a combined telephone-telegraphy system which utilizes to a large extent the telephone-telegraphy equipment as disclosed in U.S. Pat. No. 3,384,714. Generally included in Pat. No. 3,384,714 is a single communication loop including a plurality of local fire alarm boxes connected in a series circuit by a single metallic signal line across the output terminals of a central station. The output terminals are connected across a direct current source so that direct current, on the order of 100 milliamperes, normally flows through the signal line. As discussed in greater detail in Pat. No. 3,384,714, each of the local boxes in the signal communication loop includes means for transmitting a distinctive coded frequency signal, identifying the calling station to the central station, and means for transmitting and receiving voice frequency signals to and from the central station. The central station equipment described in that application includes means for decoding the coded frequency signals as well as voice communication means for transmitting and receiving voice communications to and from the calling boxes.

FIG. 1 illustrates two communication loops A and A′, each including a box circuit B having a plurality of the series connected calling boxes disclosed in the above-identified application. In FIG. 1, however, each loop A, A′ also includes a relay K1, K2 and a conventional fire alarm box X1, X2, all connected together in a closed series loop. Loops A and A′ are coupled to central station C by means of a substation F, which includes relays K1 and K2, as well as a closed loop tie line TL. Tie line TL includes series connected, normally closed, relay contacts K1–C and K2–C of relays K1 and K2, respectively. Conventional fire alarm decoding equipment E is connected to tie line TL.

Each box X1, X2 includes a spring driven code wheel (not shown) which, upon actuation of a lever or the like, serves to open and close a set of normally closed contacts 9 to interrupt the direct current normally flowing in the communication loop. This current is interrupted in accordance with a distinctive code representative of the particular alarm box X1, X2 which has been actuated. Each interruption of the current flow in loops A, or A′ de-energizes relay K1 or K2 to open relay contacts K1–C or K2–C. This, in turn, results in a corresponding interruption of the direct current normally flowing in tie line TL. Decoding equipment E decodes this distinctive coded manner of current interruption to provide a readout, at the central station, indicative of the box location of the actuated alarm box.

Tie line TL, as shown in FIG. 1, is also connected to equipment D at the central station C. Equipment D preferably takes the form of the previously discussed central station equipment disclosed in Pat. No. 3,384,714; to wit, equipment D includes coded frequency decoding means and two-way voice frequency communication means. But, due to the electro-mechanical coupling between tie line TL and loops A and A′, coded frequency and voice frequency signals cannot be effectively passed between equipment D and the calling boxes in box circuits B.

In accordance with the present invention, there is provided substation by-pass equipment G and repeat coil transformers L1, L2 and L3 interconnected with tie line TL and loops A and A′ as shown in FIG. 1. This additional equipment permits the coded frequency signals transmitted by the calling boxes in box circuits B to be bypassed through substation F to equipment D at central station C. This additional equipment also permits voice communications between central station equipment D and the calling boxes in box circuits B.

SUBSTATION BYPASS EQUIPMENT

Figure 2:
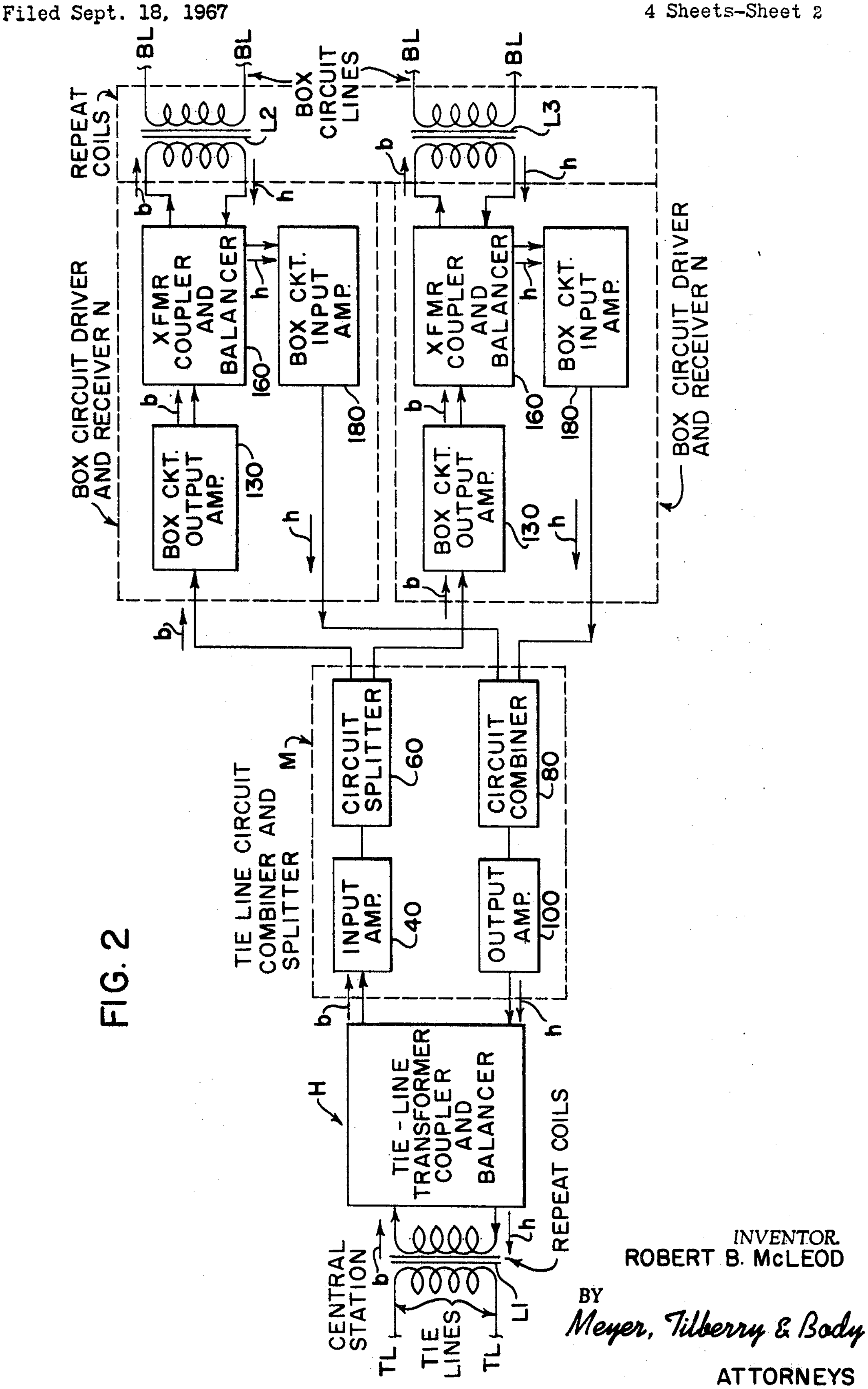
FIG. 2 is a schematic block diagram of the substation equipment.

In accordance with the present invention, FIG. 2 is a schematic block diagram of substation bypass equipment G. This bypass equipment includes: tie line transformer coupler and balancer H; and, tie line circuit combiner and splitter M, consisting of a tie line input amplifier, a circuit splitter, a circuit combiner and a tie line output amplifier. Also included in the bypass equipment G is a box circuit driver and receiver unit N for each loop A, A′. Preferably, an even number of units N are used as will be more fully explained in the detailed description to follow. Each driver and receiver unit N includes; a box circuit output amplifier; a transformer coupler and balancer identical to coupler and balancer H; and, a box circuit input amplifier. Repeat coils L1, transformer couple the central station tie line to bypass coupler and balancer H, and repeat coils L2, L3 transformer couple the signal lines of the box circuits to the corresponding driver and receiver units N.

TIE LINE TRANSFORMER COUPLER AND BALANCER

Figure 3:
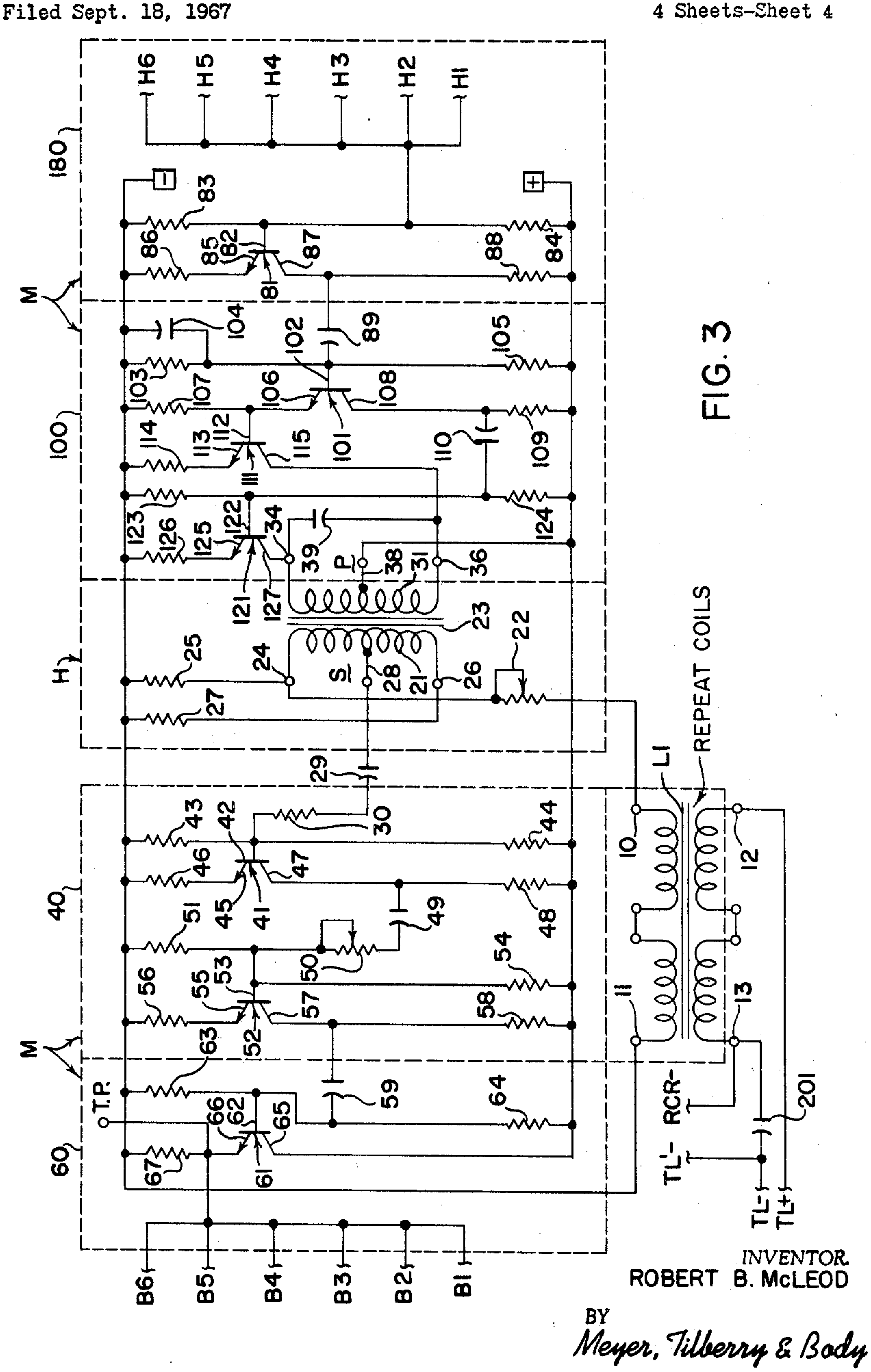
FIG. 3 is a schematic diagram illustrating the tie line transformer coupler and balancer and the tie line circuit combiner and splitter.

The tie line transformer coupler and balancer H, as shown in FIG. 3, includes a balancing potentiometer 22 and a transformer 23. One end of the resistance portion of potentiometer 22 is connected to one side 10 of the secondary winding of repeat coils L1, and the other side 11 of this secondary winding to minus voltage. The other end of the resistance portion of potentiometer 22 is connected to one side 24 of secondary winding 21 of transformer 23. Secondary winding side 24 is connected to a minus voltage through a balancing resistor 25. The other side 26 of transformer winding 21 is connected to the minus voltage through a balancing resistor 27. A center tap 28 on winding 21 is connected, as the output for signals following arrow *b* (see FIG. 2) originating in central station C, to coupling capacitor 29 as the input of tie line circuit combiner and splitter M. Transformer primary winding 31 has winding ends 34 and 36 jumpered by a capacitor 39. A primary center tap 38 on primary winding 31 is connected to the plus voltage. Winding ends 34 and 36 serve as the input from the tie line circuit combiner and splitter M for signals following arrow *h* (see FIG. 2) originating in box circuit B.

TIE LINE CIRCUIT COMBINER AND SPLITTER

With reference to FIG. 3, the tie line circuit combiner and splitter M of the present invention includes: tie line input amplifier 40; circuit splitter 60; circuit combiner 80; and, tie line output amplifier 100. The input to circuit M is into amplifier 40 from the capacitor 29, through the resistor 30, to a common emitter amplifier stage including an NPN transistor 41. Transistor 41 has a base 42 serving as the input and connected at the junction of a resistor 43, which is tied to minus voltage, and a resistor 44, which is tied to plus voltage. The emitter 45 of transistor 41 is connected to minus voltage through a resistor 46. The collector 47 of transister 41 is connected to plus voltage through a resistor 48, and is coupled through a capacitor 49 to a volume control potentiometer 50, which attenuates the signal in conjunction with a resistor 51 and the input impedance of the NPN transistor stage. An NPN transistor 52 has its base 53 connected to the junction of resistors 51 and 54 respectively. Transistor 52 is used in a common emitter amplifier configuration with its emitter 55 connected to minus voltage through a resistor 56. The collector 57 of transistor 52 is tied to plus voltage through a resistor 58, and is coupled through a capacitor 59 to the base of an NPN transistor 61 in circuit splitter 60. The base 62 of transistor 61 is connected to the junction of a pair of series connected resistors 63 and 64 which are respectively connected to the negative and positive voltage sources. Collector 65 of transistor 61 is directly connected to the plus side of the voltage source. Transistor 61 is used in a common collector stage which, because of its low output impedance, serves as a driver to drive six similar transistor circuits in the embodiment shown. Emitter 66 of transistor 61 serves as the output and it is also tied to minus voltage through resistor 67. This output is tied to a common bus B1 through B6, which in reality, commons the inputs to the individual box circuit driver and receiver units N.

The second input to tie line circuit M is by way of a common bus H1 through H6, from one of the box circuit driver and receiver units N. This input is fed to the circuit combiner NPN transistor 81. The base 82 of transistor 81 serves as the input and is connected to the junction of a pair of series connected resistors 83 and 84 which are respectively connected to the negative and positive voltage source. The emitter 85 of transistor 81 is connected to minus voltage through resistor 86. The output of combiner 80 is taken from collector 87 of transistor 81 and is connected to plus voltage through a resistor 88. This output is coupled through capacitor 89 to the tie line output amplifier 100.

The first stage of amplifier 100 has the base 102 of an NPN transistor 101 connected through a resistor 103 to the negative voltage and through a resistor 105 to the positive voltage. A capacitor 104 is connected in parallel with resistor 103. This first stage serves two functions, that of a phase splitter and also of a driver. Two outputs of opposite polarity are taken from this stage, one output from emitter 106 of transistor 101, and the other output from the collector 108 of transistor 101. Emitter 106 and collector 108 of transistor 101 are connected through resistors 107 and 109 to the negative and positive voltages, respectively. These two out of phase outputs are used to drive a conventional Class A output amplifier, including NPN transistors 111 and 121. The output from emitter 106 of transistor 101 is coupled directly to base 112 of transistor 111, whose emitter 113 is taken to minus voltage through a resistor 114. The output of transistor 111 is from its collector 115, which is tied to a primary winding 31 at point 36 of tie line transformer coupler and balancer H. The output from collector 108 of transistor 101 is coupled through a capacitor 110 to transistor 121 at base 122, which is connected to the minus and plus voltages through resistors 123 and 124 respectively. Emitter 125 of transistor 121 is wired to minus voltage through resistor 126, while collector 127 is taken directly to the primary winding 31 of transformer 23 at point 34. Therefore, the output of the tie line output amplifier 100 is the second output of the tie line circuit combiner and splitter M and is developed across the transformer primary winding 31 of the tie line transformer coupler and balancer H.

CALL BOX CIRCUIT DRIVER AND RECEIVER

Figure 4:
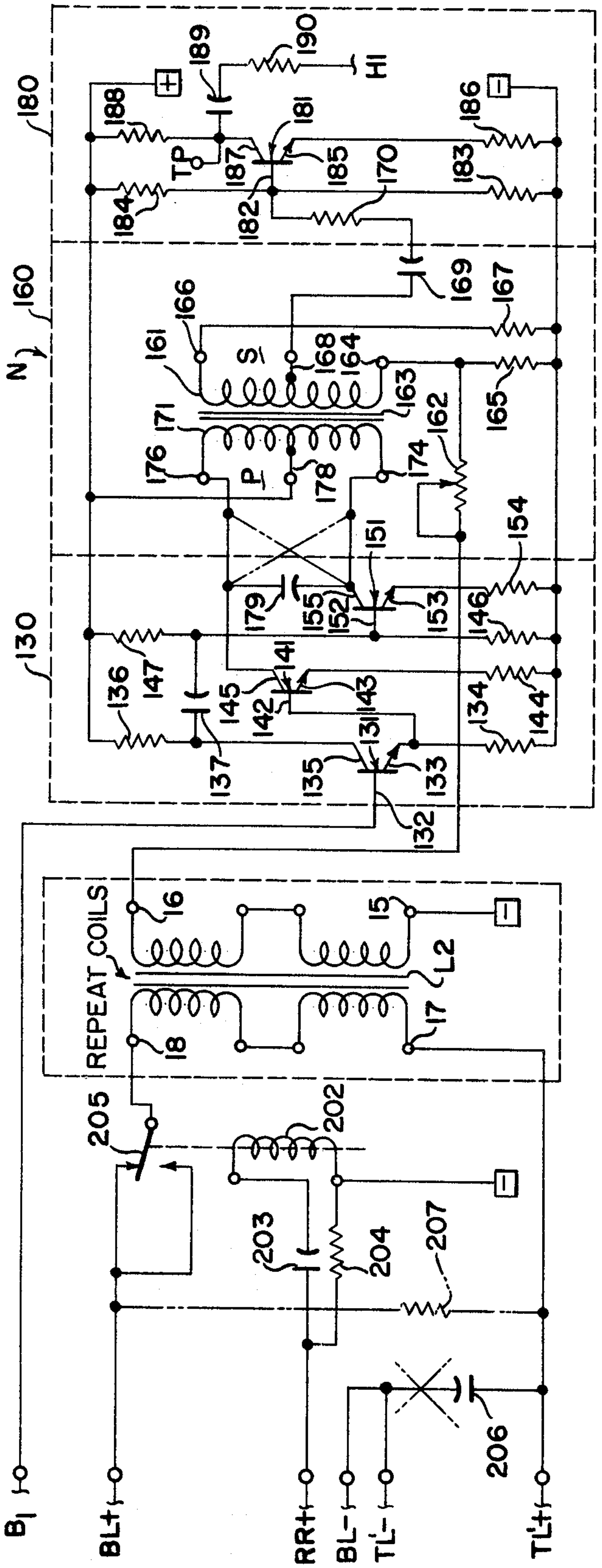
FIG. 4 is a schematic diagram illustrating the call box circuit driver and receiver.

A call box circuit driver and receiver unit N is shown in FIG. 4 and it includes: box circuit output amplifier 130; transformer coupler and balancer 160; and box circuit input amplifier 180. The input to unit N is taken from bus B1 through B6, depending on the call box circuit operating, and is the output from circuit splitter 60. This bus input is impressed upon box circuit output amplifier 130, which is similar to tie line output amplifier 100. Input B1 feeds into NPN transistor 131 at base 132. Two out of phase outputs are taken from transistor 131 and are used to drive a conventional push-pull Class A output amplifier including NPN transistors 141 and 151. The emitter 133 of transistor 131 is wired to minus voltage through resistor 134, and to base 142 or transistor 141. The collector 135 of transistor 131 is wired to plus voltage through a resistor 136, and to base 152 of a transistor 151 through a capacitor 137. Emitter 143 of transistor 141 is taken to minus voltage through a resistor 144 while the collector 145 is taken to one side 176 of primary winding 171 of transformer 163. Base 152 of transistor 151 is wired to minus to plus voltage through resistors 146 and 147, respectively. Emitter 153 of transistor 151 is wired to minus voltage through a resistor 154. Collector 155 of transistor 151 is wired to the other side 174 of primary winding 171. Thus, the output from box circuit output amplifier 130 is the input to transformer coupler and balancer 160, which is identical in operation to coupler and balancer H.

The input from amplifier 130 to coupler and balancer 160 is wired to primary winding 171 of transformer 163. The output in this instance, is developed across secondary winding 161. A potentiometer 162 is used for balancing the impedances across secondary winding 161. One end of the resistance portion of potentiometer 162 is tied to winding end 164, which in turn is wired to the minus side of the resistance portion of potentiometer 162 is tied to line repeat coils L2 is wired to the other end of the resistance portion of the potentiometer 162. Winding end 166 is wired to the minus side of the line voltage through resistor 167. Center tap 168 on winding 161 is wired to the box input amplifier 180 through a capacitor 169. As previously explained, primary winding 171 is used as the input winding for the output of amplifier 130, wired to winding ends 174 and 176. Center tap 178 on primary winding 171 is wired directly to plus voltage, and a capacitor 179 is wired in shunt across winding 171. Preferably, an even number of units N are used. This is done to reduce the tendency for oscillations in the system. To further reduce this tendency, the primary winding 171 of every other box circuit driver and receiver unit N is reversed, as illustrated by the alternate wiring in FIG. 4.

Box circuit input amplifier 180 amplifies a signal from a box circuit B impressed on repeat coils L2 at points 17 and 18, from terminals designated as BL+ and BL—. The induced signal appears between points 15, 16 on repeat coils L2. Point 15 is connected to the minus side of the line voltage. Point 16 is connected to one end of the resistance portion of balancing potentiometer 162. The other end of the resistance portion of potentiometer 162 is tied to point 164 of winding 161. Center tap 168 on winding 161 now serves as an output, through a coupling capacitor 169 and a resistor 170, to feed base 182 of an NPN transistor 181. Base 182 is wired to the minus and plus voltages through series resistors 183 and 184, respectively. The emitter 185 of transistor 181 is taken to minus voltage through a resistor 186. The output of amplifier 180 is from collector 187, which is tied to plus voltage through a load resistor 188, and is fed through a capacitor 189 and a relatively high resistance 190, in comparison, to the collector load resistor 188, to bus line H1 through H6. As was explained previously, this bus line is the common bus line for the outputs of the other box circuit input amplifiers.

MISCELLANEOUS

Figure 5:
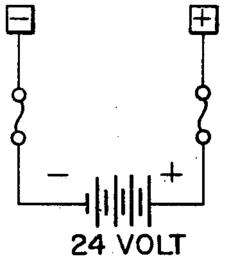
FIGS. 5 and 6 show the substation power supply, and reset control relay, respectively.
Figure 6:
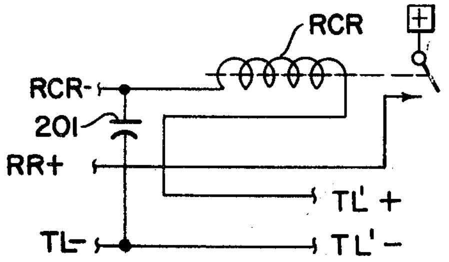

FIG. 5 shows the self-contained substation voltage supply, while FIG. 6 shows a reset control relay. In FIG. 6, the central station minus tie line TL— is shown connected to one side of substation reset relay pickup RCR— through an AC bypass capacitor 201, and to the tie line repeat coils L1 at point 13 (see FIG. 3). L1 is also shown connected to TL'—, which, with line TL'+, is used for system reset. In FIG. 3 the plus side of the central station tie line TL+ is shown connected to tie line repeat coils L1 at point 12. As shown in FIG. 4, line RR is connected to a reset relay 202 through a capacitor 203 and a resistor 204 in parallel across relay 202 coil. The other side of resistor 204 is tied to minus voltage. There is a reset relay 202 for every box circuit driver and receiver unit N. Also shown in FIG. 4, box line BL+ is connected to the box circuit repeat coils L2 at point 18, through the points of reset relay 202. The box line BL— is connected to the other side of the box circuit repeat coils L2 at point 17, through an AC bypass capacitor 206. To provide the even number of box circuit driver and receiver units N, it is sometimes necessary to install a dummy unit in the substation. As shown in FIG. 4, a resistor 207 is jumpered across lines BL+ and TL'+ and the connection from a capacitor 206 to lines BL— and TL'— is not made on the dummy unit so installed.

OPERATION

In accordance with this invention, a voice signal from the central station is impressed upon the tie line repeat coils L1 at 12 and 13, FIG. 3. This signal is impressed between points 10 and 11 of repeat coils L1 where it feeds transformer coupler and balancer H. Coupler and balancer H is a device that directs the signal in the direction of the arrows marked *b* and *h* in FIG. 2. The arrow *b* marks the direction of the substation incoming signal whereas the arrow *h* marks the direction of the box circuit incoming signal. Coupler and balancer H essentially prevents the signals signified by arrows *b* and *h* from being fed in the wrong direction.

Referring to FIG. 3, the coupler and balancer H consists basically of a 1K potentiometer 22, transformer 23 and resistors 25 and 27. If a voltage is impressed on the primary winding 31, a voltage will be induced in the secondary winding 21. Transformer 23 is designed so that an equal number of turns exist from ends 24 and 26 to center tap 28, thus equal voltages will be induced in each portion of secondary winding 21. In addition, resistance values for resistors 25 and 27 and potentiometer 22 have been selected so that the voltage drops across resistor 27, and resistor 25 and potentiometer 22 in parallel are adjusted so as to be equal. Thus, the voltage at center tap 28, as measured to either side of the line, will be zero. Essentially, a balanced bridge has been produced, but this balance is achieved only when the signal is impressed upon primary winding 31.

The signal from the tie line repeat coil is impressed upon transformer secondary winding 21 at 24. Approximately half of this signal appears at center tap 28 because of the high reflected load of primary winding 31 and push-pull transistor amplifier, 111 and 121, in comparison with resistor 25 or resistor 27. Essentially then, the signal is controlled to follow the correct circuit.

Figure 4A:
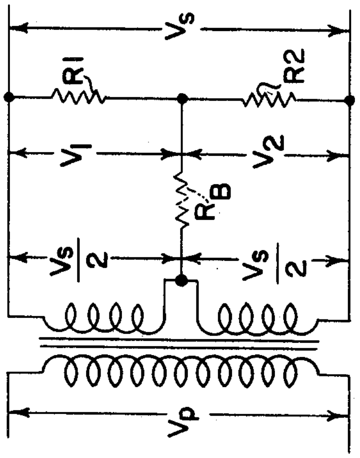
FIG. 4A is a schematic diagram illustrative of the transformer coupler and balancer.

The operation of this transformer coupler and balancer is illustrated by FIG. 4A, wherein V*p* is representative of the voltage impressed on the primary, and the voltage V1 and V2 represent the equal voltages across the secondary winding resistors R1 and R2. If a resistor R*b* were connected from the center tap to the junction of the resistors R1 and R2, the voltage across it would equal zero. Essentially, a balanced bridge has been produced, but the balance is achieved only when a signal is impressed on the primary. If, however, a signal were impressed across either R1 or R2, making it the source voltage, approximately half of this signal voltage would appear across resistor R*b*, if the reflected load were high in comparison to either resistor R1 or resistor R2. This is the case when the primary winding is part of a push-pull amplifier and each end of the winding is connected to the collector of a transistor forming part of the amplifier.

The signal at point 28 is coupled by capacitor 29 to tie line input amplifier 40. The output of tie line input amplifier 40 is coupled through a capacitor 49 to a volume control potentiometer 50, which attenuates the signal in conjunction with a resistor 51 and the input impedance of the following transistor 52, which is in a common emitter stage. This attenuated signal is amplified in transistor 52, and then coupled through a capacitor 59 to the circuit splitter 60. Transistor 61 is part of a common collector stage, and because of the low impedance, is used as a driver to drive six similar transistor circuits tied to bus, B1 through B6. These transistor circuits have been identified as box circuit driver and receiver units N.

Referring now to FIG. 4, since all six of these box circuit driver and receiver N circuits operate identically, excepting for the transformer 163 winding reversal and the wiring for the dummy unit, only one such circuit operation will be explained. The input signal applied to bus B1 is fed to first stage transistor 131 of the box circuit output amplifier 130. As was explained previously, this stage serves as a phase splitter and as a driver. The out of phase outputs of transistor 131 are used to drive transistors 141 and 151, operating as a conventional push-pull Class A output amplifier. The output of this amplifier is developed across transformer winding 171 of transformer coupler and balancer 160. This transformer coupler and balancer 160 operates the same as tie line transformer coupler and balancer H. By adjusting a potentiometer 162, which is in series with the reflected box circuit line load, so that equal voltages are developed across winding ends 164 and 166 to center tap 168, zero voltage is developed at center tap 168 relative to minus voltage. Since center tap 168 is also the input to tie line output amplifier 100, no voltage will be passed back through the circuit to circuit combiner 80 (see FIG. 2). A voltage signal is thus developed at winding end 164, which signal is fed through a potentiometer 162 to the box circuit repeat coils L2, across points 15 and 16. This signal induces an output across points 17 and 18 to lines BL+ and BL−, to feed the selected box circuit B. Thus, a signal originating from the central station C has been traced through the substation bypass equipment to the transformer coupler and balancer of each box circuit line, and through the box circuit repeat coil to the selected box circuit. With proper balancing of the potentiometers 22 (FIG. 3) and 162 (FIG. 4) the signal is directed to the proper circuits. Potentiometer 162 has a total resistance value of 500 ohms which was selected so that the combination of potentiometer 162, shunt resistor 165 and the series reflected line resistance through repeat coils L2 would equal the resistance of resistor 167. This is feasible since the reflected line resistance could be expected to vary from 160 to 660 ohms in a standard fire alarm circuit.

The reverse process, box circuit B to central station C is easily understood since the circuits are practically the same. Referring to FIG. 4, the box circuit input signal is fed from lines BL+ and BL− to the box circuit repeat coils, through a potentiometer 162 to transformer coupler and balancer 160 secondary winding 161. As was explained previously, approximately half of this signal voltage will appear at center tap 168, where it is capacitor coupled through a capacitor 169 to box circuit input amplifier 180. The output of amplifier 180 is fed through a relatively high resistance 190, relative to collector load resistor 188, to the circuit combiner 80 onto bus H1 through H6, where the outputs of the other box circuit driver and receivers are commoned.

Referring now to FIG. 3, the input to tie line output circuit combiner and splitter M is from bus H1 through H6 to amplifier 81 of circuit combiner 80. The output of amplifier 81 is fed to tie line output amplifier 100, which is a push-pull Class A amplifier as described previously, which includes transistors 101, 111 and 121. The output of tie line output amplifier 100 is fed to tie line transformer coupler and balancer H across primary winding 31. The operation for signals impressed on the primary winding is as previously described, with the result that the output of this transformer coupler and balancer is fed from secondary winding 21 and through a balancing potentiometer 22 to the tie line repeat coils L1, through the repeat coils to the tie line output TL+ and TL−. Thus, a signal from any of the box circuits B has been coupled to the central station C tie lines, with the added result that certain of the circuits were bypassed.

While particular embodiments of the invention have been illustrated and described, it will be obvious to those skilled in the art that various structural modifications may be made in the preferred embodiment of the present invention as disclosed in the drawing without departing from the spirit and scope of the appended claims.

Having thus described my invention, I claim:

1. In a combined telephone-telegraphy system comprising a first series circuit including a first plurality of local calling boxes and at least one current interrupter means and central station communication equipment coupled together in a circuit and adapted to be connected across a power source for maintaining current flow in said circuit, each of said local calling boxes including voice communication means for transmitting and receiving voice frequency signals to and from said central station equipment as well as telegraphy means for transmitting coded box identifying frequency signals to said central station equipment, said current interrupter means being adapted to interrupt said current flow in said circuit, said central station equipment including voice communication means for transmitting and receiving voice frequency signals to and from said local calling boxes as well as calling box identifying means responsive to said coded box identifying frequency signal for identifying the particular box transmitting said coded box identifying signals; the improvement comprising: a second series circuit including a second plurality of said local calling boxes and at least a second said current interrupter means for interrupting current flowing in said second series circuit; and means for coupling said second series circuit and said first series circuit with said central station for transmitting and receiving voice and telegraphy communication signals between said central station and a said calling box in either of said series circuits.

2. In a combined telephone-telegraphy system as set forth in claim 1 wherein said coupling means includes means for respectively transformer coupling said first and second series circuits to said central station.

3. In a combined telephone-telegraphy system as set forth in claim 2 wherein said transformer coupling means includes a first and second transformer means.

4. In a combined telephone-telegraphy system as set forth in claim 3 wherein said second transformer means includes a plurality of transformers and a plurality of balancing means for controlling the output of said second transformer means.

5. In a combined telephone-telegraphy system as set forth in claim 3 wherein said second transformer means includes balancing means for controlling the output of said second transformer means, said balancing means being effective only when said voice and telegraphy communication signals are impressed upon the transformer primary of said second transformer means.

6. In a combined telephone-telegraphy system as set forth in claim 5 wherein said balancing means is connected to the transformer secondary of said second transformer means.

7. In a combined telephone-telegraphy system as set forth in claim 2 wherein said coupling means includes by-passing means connected to said transformer coupling for controlling the passage of said communication signals between said central station and a said call box in either of said series circuits.

8. In a combined telephone-telegraphy system comprising a first series circuit including a first plurality of local calling boxes and central station communication equipment coupled together in a circuit and adapted to be connected across a power source for maintaining current flow in said circuit, each of said local calling boxes including voice communication means for transmitting and receiving voice frequency signals to and from said central station equipment as well as telegraphy means for transmitting coded box identifying frequency signals to said central station equipment, said central station equipment including voice communication means for transmitting and receiving voice frequency signals to and from said local calling boxes as well as calling box identifying means responsive to said coded box identifying frequency signals for identifying the particular box transmitting said coded box identifying signals, the improvement comprising: a second series circuit including a second plurality of said local calling boxes, means for coupling said second series circuit and said first series circuit with said central station for transmitting and receiving voice and telegraphy communication signals between said central station and a said calling box in either of said series circuit, said coupling means includes means for respectively transformer coupling said first and second series circuits to said central station, and bypassing means connected to said transformer coupling for controlling the passage of said communication signals between said central station and a said call box in either of said series circuits, said by-passing circuit means including: first signal coupling means coupled to said transformer coupling for passing said central station communicating signals from said central station to a said call box in either of said series circuits;

a plurality of second signal coupling means, each coupled to said transformer coupling for passing said box circuit communication signals from a said box circuit to said central station;

a plurality of first electronic circuit means, each for passing said central station communication signals from said first signal coupling means to each of said second signal coupling means; and a plurality of second electronic circuit means, each for passing said box circuit communication signals from a said second signal coupling means to said first signal coupling means.

9. In a combined telephone-telegraphy system as set forth in claim 8 wherein said first and second signal coupling includes:

a transformer having a primary and secondary winding; and a balancing means for controlling the output of said transformer, said balancing means being effective only when said communication signals are impressed upon said primary winding.

10. In a combined telephone-telegraphy system as set forth in claim 9 wherein said balancing means is connected to said secondary winding.

11. In a combined telephone-telegraphy system as set forth in claim 8 wherein each said first electronic circuit means includes means for amplifying said central station communication signals, said amplifying means being connected between said first and second signal coupling means.

12. In a combined telephone-telegraphy system as set forth in claim 11 wherein said amplifying means includes a first and second amplifier.

13. In a combined telephone-telegraphy system as set forth in claim 12 wherein each said first electronic circuit means includes splitter circuit means connected between said first and second amplifier for passing said central station communication signals to a said call box, said splitter circuit means having a plurality of outputs, each said output being connected to a said second amplifier.

14. In a combined telephone-telegraphy system as set forth in claim 8 wherein each said second electronic circuit includes means for amplifying said box circuit communication signals, said amplifying means being connected between said first and second signal coupling means.

15. In a combined telephone-telegraphy system as set forth in claim 14 wherein said amplifying means includes a first and second amplifier.

16. In a combined telephone-telegraphy system as set forth in claim 15 wherein said second electronic circuit includes a combiner circuit means connected between said first and second amplifier for passing said box circuit communication signals to said central station, said combiner circuit means having a plurality of inputs, each said input being connected to a said first amplifier.

17. In a combined telephone-telegraphy system as set forth in claim 16 wherein each said first electronic circuit means includes means for amplifying said central station communication signals, said amplifying means being connected between said first and second signal coupling means.

18. In a combined telephone-telegraphy system as set forth in claim 17 wherein said amplifying means includes a first and second amplifier.

19. In a combined telephone-telegraphy system as set forth in claim 18 wherein each said first electronic circuit means includes a splitter circuit means connected between said first and second amplifier for passing said central station communication signals to a said call box, said splitter circuit means having a plurality of outputs, each said output being connected to a said second amplifier.

References Cited

UNITED STATES PATENTS

| | | | |
|---|---|---|---|
| 3,384,714 | 5/1968 | Weld | 179—3 |
| 3,456,242 | 7/1969 | Lubkin | 340—172.5 |

RALPH D. BLAKESLEE, Primary Examiner